Aug. 19, 1958 G. V. TAPLIN ET AL 2,848,625
GAMMA AND X-RAY DOSIMETER AND DOSIMETRIC METHOD
Filed Aug. 13, 1953 8 Sheets-Sheet 1

RESOLUTION OF RATE DEPENDENCY IN CHLOROFORM
BY THE USE OF ETHYL ALCOHOL

PREVENTION OF ACID EVOLUTION FROM
CHLOROFORM AFTER IRRADIATION BY THE
ADDITION OF ETHYL ALCOHOL

INVENTORS.
GEORGE V. TAPLIN
CLAYTON H. DOUGLAS
SANFORD C. SIGOLOFF
BY
Roland A. Anderson
ATTORNEY.

ENERGY DEPENDENCE OF CHLOROFORM STABILIZED
WITH INCREASING CONCENTRATIONS OF ETHYL ALCOHOL

Aug. 19, 1958   G. V. TAPLIN ET AL   2,848,625
GAMMA AND X-RAY DOSIMETER AND DOSIMETRIC METHOD
Filed Aug. 13, 1953   8 Sheets-Sheet 3

THE UNIFORM RELATION BETWEEN ACID PRODUCTION FROM CHLOROFORM AND ITS ALCOHOL CONTENT WHEN IRRADIATED WITH BEAMS OF DIFFERENT EFFECTIVE ENERGIES

INVENTORS.
GEORGE V. TAPLIN
CLAYTON H. DOUGLAS
BY SANFORD C. SIGOLOFF

ATTORNEY.

EFFECT OF VARYING THE TEMPERATURE OF CHLOROFORM DURING X-IRRADIATION ON ACID PRODUCTION FROM SAMPLES STABILIZED WITH INCREASING CONCENTRATIONS OF ETHYL ALCOHOL

Aug. 19, 1958   G. V. TAPLIN ET AL   2,848,625
GAMMA AND X-RAY DOSIMETER AND DOSIMETRIC METHOD
Filed Aug. 13, 1953   8 Sheets-Sheet 5

COMPARATIVE EFFECTS OF ALCOHOL AND HYDROQUINONE
ON ACID PRODUCTION FROM ROENTGEN RADIATED CHLOROFORM (Resolution of Rate Dependency)

INVENTORS.
GEORGE V. TAPLIN
CLAYTON H. DOUGLAS
BY   SANFORD C. SIGOLOFF

ATTORNEY.

Aug. 19, 1958 G. V. TAPLIN ET AL 2,848,625
GAMMA AND X-RAY DOSIMETER AND DOSIMETRIC METHOD
Filed Aug. 13, 1953 8 Sheets-Sheet 6

REDUCTION OF RATE DEPENDECY OF
CHLOROFORM SYSTEMS BY RESORCINOL

EFFECT ON ACID PRODUCTION / r BY VARYING
THE TEMPERATURE OF RESORCINOL STABILIZED
CHLOROFORM SYSTEMS DURING X-IRRADIATION

INVENTORS.
GEORGE V. TAPLIN
CLAYTON H. DOUGLAS
SANFORD C. SIGOLOFF
BY

ATTORNEY.

Aug. 19, 1958  G. V. TAPLIN ET AL  2,848,625
GAMMA AND X-RAY DOSIMETER AND DOSIMETRIC METHOD
Filed Aug. 13, 1953  8 Sheets-Sheet 7

RELATION BETWEEN pH OF BROMCRESOL PURPLE AND DOSAGE OF Co⁶⁰ GAMMA RADIATION

RELATION BETWEEN pH OF BROMCRESOL PURPLE SOLUTIONS AND THE RATIO OF PER CENT LIGHT TRANSMISSION AT 590 mμ AND 430 mμ

INVENTORS.
GEORGE V. TAPLIN
CLAYTON H. DOUGLAS
BY SANFORD C. SIGOLOFF

Roland A. Anderson
ATTORNEY.

Aug. 19, 1958 G. V. TAPLIN ET AL 2,848,625
GAMMA AND X-RAY DOSIMETER AND DOSIMETRIC METHOD
Filed Aug. 13, 1953 8 Sheets-Sheet 8

INVENTORS.
GEORGE V. TAPLIN
CLAYTON H. DOUGLAS
BY SANFORD C. SIGOLOFF

ATTORNEY

United States Patent Office 2,848,625
Patented Aug. 19, 1958

2,848,625

GAMMA AND X-RAY DOSIMETER AND DOSIMETRIC METHOD

George V. Taplin and Clayton H. Douglas, Los Angeles, and Sanford C. Sigoloff, Beverly Hills, Calif., assignors to the United States of America as represented by the United States Atomic Energy Commission Application August 13, 1953, Serial No. 387,556

19 Claims. (Cl. 250—83)

The present invention relates generally to improvements in gamma and X-ray dosimetry and, especially, to improvements of the two-phase type of gamma and X-ray dosimetric system disclosed in the copending application of Taplin and Douglas, Serial No. 158,282, filed April 26, 1950, which issued as Patent No. 2,682,510 on June 29, 1954.

As disclosed in said application, a system comprising a chlorinated hydrocarbon phase in contact with a pH adjusted aqueous dye phase may serve to determine gamma and X-ray quantities. Various liquid aliphatic chlorinated hydrocarbons, such as chloroform and carbon tetrachloride, are employed as the chlorinated hydrocarbon phase. The dye phase is an aqueous solution of an acidimetric dye and basic substances to adjust the pH and titrimetric characteristics of the system to the appropriate point.

The chlorinated hydrocarbon employed in said system is purified by a washing technique which removes added stabilizing agent (alcohol) and other materials, providing a material more responsive to irridiation. A degree of stabilization of this system is accomplished by the qualities of the aqueous phase, particularly by using an aqueous phase which is near a neutral pH. Relatively inert containers such as borosilicate glass or polyethylene vials were also required therein for stability. Exposure of this system to usual dosages of gamma or X-ray radiation causes the evolution of proportionate amounts of acidic substances in the hydrocarbon layer which substances are preferentially extracted into the aqueous phase causing a color change therein when a predetermined amount of irradiation has occurred. The nominal value of irradiation at which the color change occurs in such system is determined as follows:

(1) Sensitivity is increased by increasing the ratio of hydrocarbon to aqueous phase.

(2) Sensitivity is decreased in almost direct proportion to an increase of the concentration of the dye in the aqueous phase.

(3) Sensitivity is increased by adjusting the pH of the aqueous phase to a value near the lower end point of the indicator range.

A wide range of radiation dosages may be determined by use of systems adjusted as above and, especially, including teachings appearing hereinafter. In preparing a dosimetric system of the foregoing type, calibration curves may be obtained for each lot of chlorinated hydrocarbon either by standardized irridation of arbitrary systems and determining the corresponding amount of acid produced or by determining the amount of irradiation required to cause a known arbitrary system to change color. Appropriate modification of phase ratios or phase composition as determined by interpolation or extrapolation may then be employed to obtain systems with the desired sensitivity. Unknown amounts of irradiation may also be determined by titration of standard sample systems exposed to the radiation.

While such system is quite useful for determining gamma and X-ray radiation quantities under a known set of conditions, large variations in irradiation rate, energy of the radiation, temperature of irradiation, and intermittent irradiation conditions cause large deviations in the results. Moreover, stability of such system at high temperatures leaves something to be desired. Some of these difficulties appear to arise from certain characteristics of the reactions involved. Evolution of acidic materials in such a system is thought to be by means of a chain reaction with an attendant after reaction which requires a considerable period of time to terminate. As the amount of acid produced by this after reaction may amount to 5–10% of the total acidity, immediate determination may be subject to possible inaccuracy. Variation in the other conditions noted can cause an even greater inaccuracy.

It has now been found that variations of the character noted above can be eliminated by adding certain normalizing substances to the system. Also, methods have been found for preparing various reagents which yield considerably improved results. Moreover, there has been developed a structural arrangement which provides advantageous features when employed with the systems of the invention.

It is therefore an object of the present invention to provide an improved colorimetric gamma and X-ray dosimetric system.

Another object of the invention is to improve the two phase chlorinated hydrocarbon-aqueous dye colorimetric dosimeter.

Another object of the invention is to provide a colorimetric system which is relatively insensitive to changes in irradiation rate, radiation energy changes, and changes in the temperature at which irradiation occurs.

Still another object of the invention is to provide means for inhibiting the after reaction in the two phase chlorinated hydrocarbon-aqueous dye colorimetric dosimeter.

A further object of the invention is the addition of specific quantities of certain normalizing agents to the two phase chlorinated hydrocarbon-aqueous dye colorimetric dosimeter to eliminate the after reaction and thereby extend the utility of such system.

A still further object of the invention is to provide an improved self-contained dosimeter for indicating exposure to gamma and X-ray radiation.

Other objects and advantages of the invention will become apparent from the following description taken together with the accompanying drawing, of which:

Figure 5:
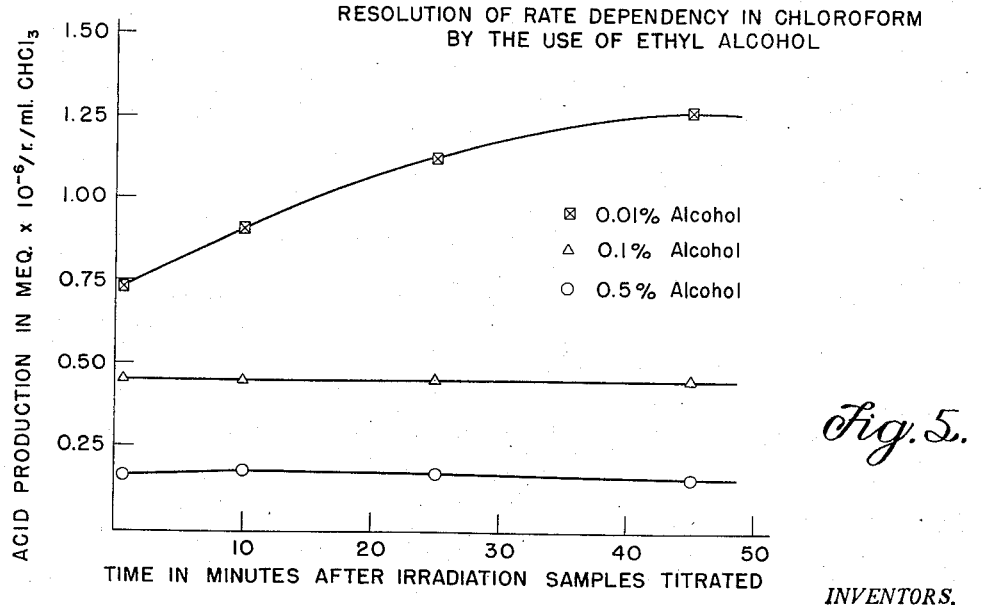
Figure 6:
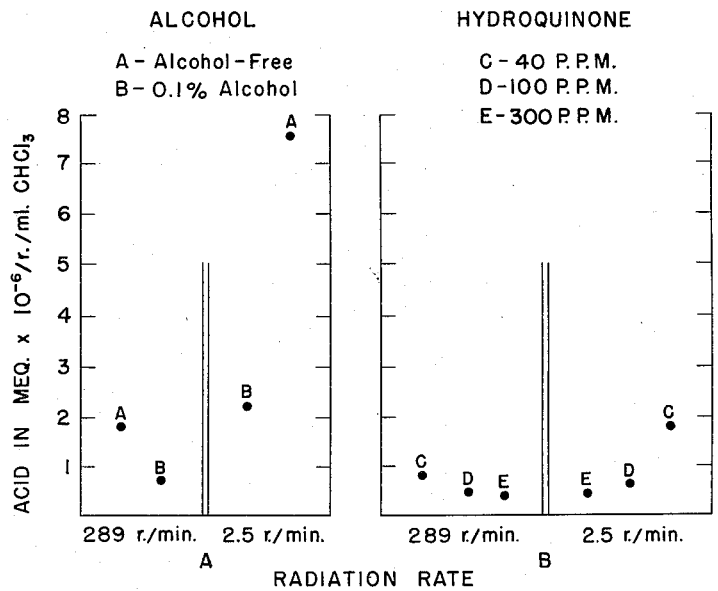
Figure 6:
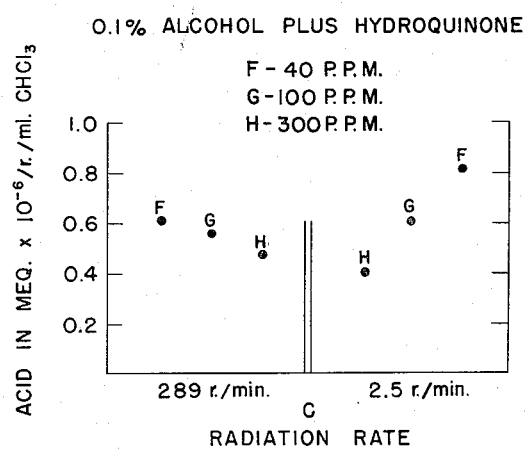
Figure 7:
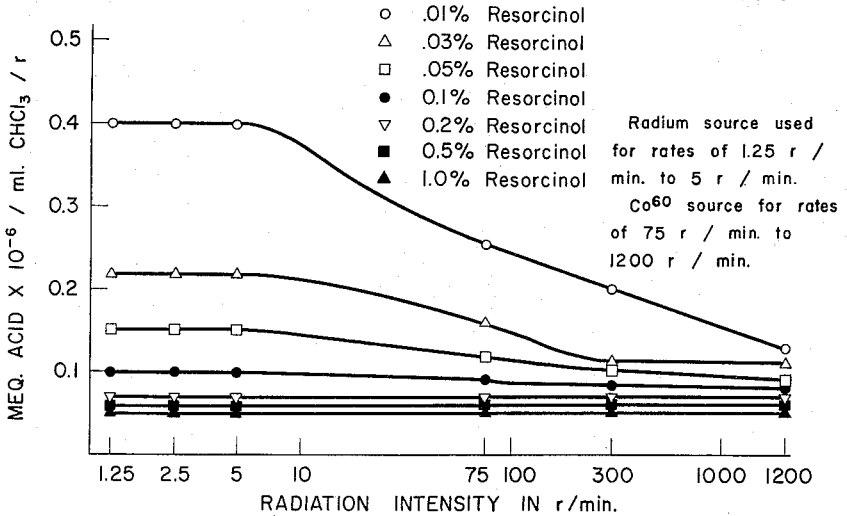
Figure 8:
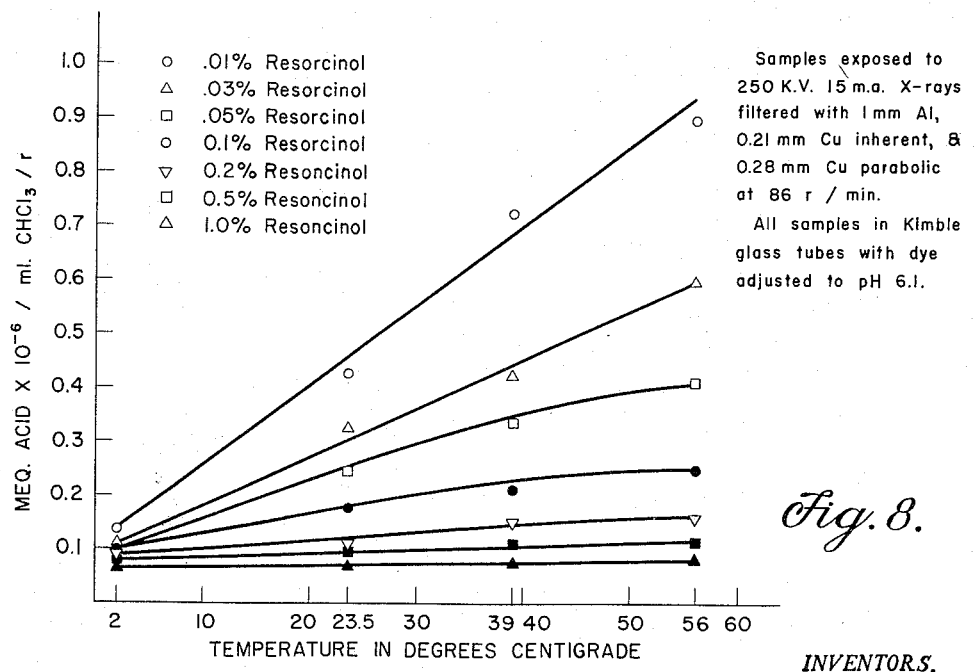
Figure 10:
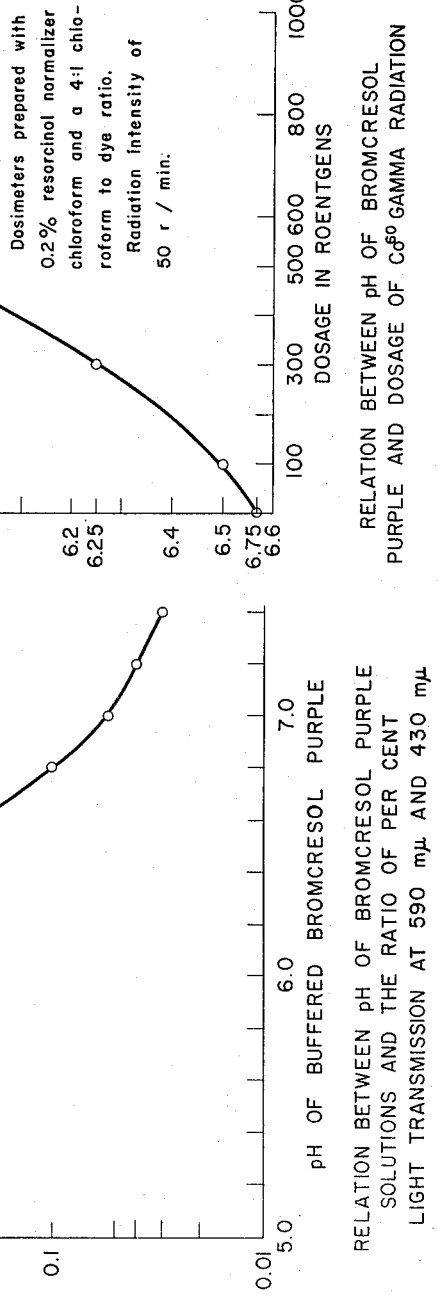
Figure 9:
Figure 12:
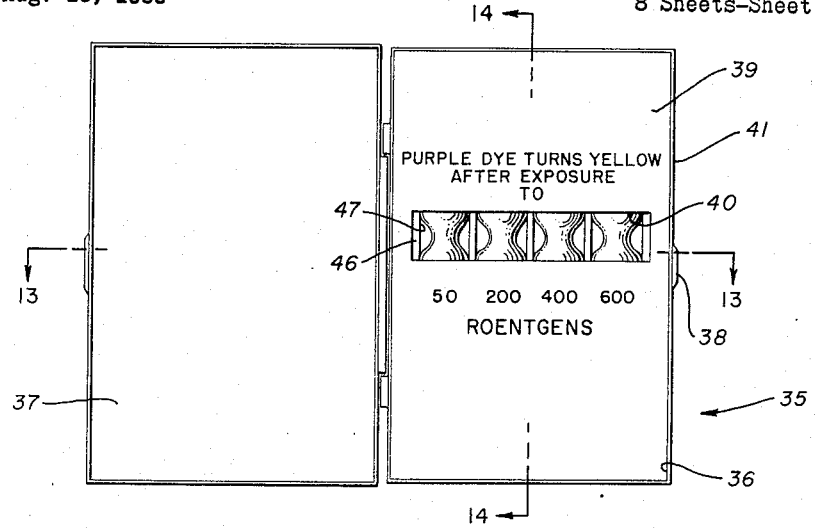
Figure 13:
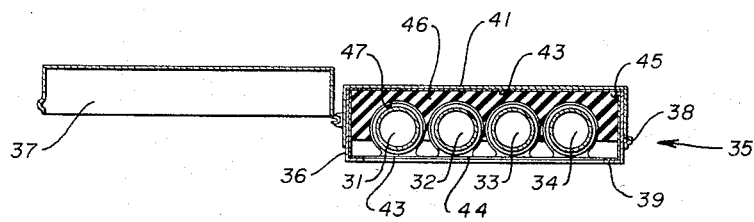
Figure 14:
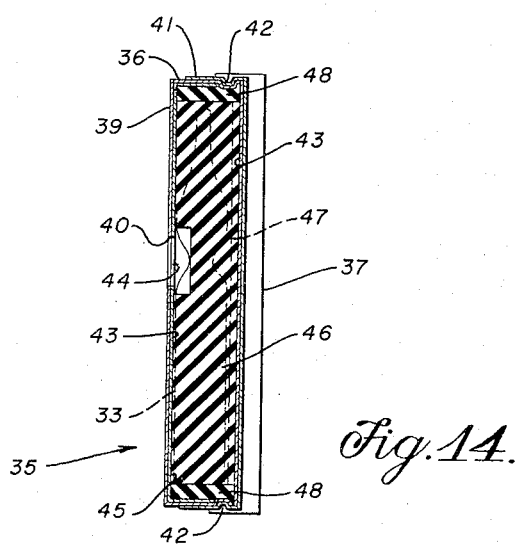
Figure 11:
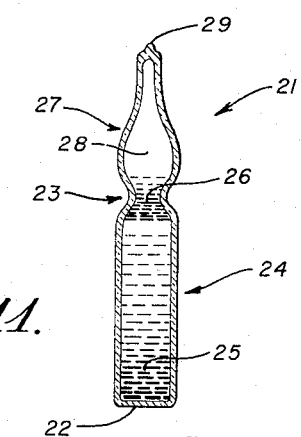

Figure 5 graphically illustrates the effectiveness of alcohol in eliminating after reactions in the dosimetric systems;

Figure 6 graphically illustrates the effectiveness of hydroquinone for rate dependency resolution as compared to alcohol;

Figure 7 graphically illustrates the reduction in rate dependency of acid production from chloroform by various concentrations of resorcinol;

Figure 8 graphically illustrates the elimination of variable irradiation temperature effects obtained by adding various concentrations of resorcinol to chloroform-aqueous dye dosimetric systems;

Figure 9 is a graphical representation of the relation between the ratio of light transmission at specific wavelengths and the pH of an aqueous bromcresol purple solution;

Figure 10 graphically represents the relation between pH of a dosimetric system and dosage of $Co^{60}$ radiation;

Figure 11 illustrates a unit cell dosimetric system;

Figure 12 is a plan view of a colorimetric dosimeter shown with the cover portion open;

Figure 13 is a transverse cross sectional view taken along the plane 13—13 of Figure 12; and Figure 14 is a cross sectional view of the dosimeter taken along the plane 14—14 of Figure 12.

In general, the colorimetric dosimetric system concerned in the present invention comprises a low-molecular weight chlorinated hydrocarbon phase in contact with an aqueous phase thereby forming a two-phase colorimetric dosimetric system. Such aqueous phase will include a suitable acidimetric indicator dye and, usually, materials for adjusting the pH thereof. The chlorinated hydrocarbon phase may include certain previously disclosed materials or may be formed of certain other materials which now have been found to possess advantageous characteristics. The quantities of acidic materials produced in this system are proportional to the radiation dosage, under grossly varied conditions; therefore, a color change in the system more accurately indicates dosage irrespective of irradiation rate, radiation energy, temperature of irradiation, and discontinuity of irradiation than do previously disclosed systems. Of prime importance in this connection is the inclusion of certain normalizer agents in the system, viz., ethyl, amyl, hexyl, nonyl, decyl, and other aliphatic alcohols, resorcinol, geraniol, metacresol, α-naphthol, benzyl alcohol, tetrahydrofurfural alcohol, tetrahydrofurfuran and methyl-n-cyclohexanol. Accordingly, it will be understood that the term "normalizer" as employed herein will generally indicate an agent which when added to a two phase, chlorinated hydrocarbon, aqueous dye phase, colorimetric dosimeter, will regulate the production of acidic materials therein so as to be very closely proportional to the quantity of irradiation (in roentgens) irrespective of irradiation rate, temperature of the dosimetric system, and discontinuity of the irradiation. Other beneficial effects will, usually, also be obtained such as improved light and thermostability, another means of regulating system sensitivity and others apparent from context of the disclosure.

When incorporated in an appropriate container to provide a dosimeter, such system may be considered to be a self-contained titrimetric system which immediately and visually indicates radiation dosages. However, usual titrimetric methods can also be used to provide fairly accurate intermediate dosage determinations while a spectrophotometric method, described more fully hereinafter, can be employed to determine dosages with a high degree of precision and to provide a means of grading colorimetric dosimeters.

It is of particular advantage to employ, in this system, a chlorinated hydrocarbon which is purified, to obtain a material which yields consistent results, as disclosed below; however, it will be appreciated that the inhibitors and other teachings of the invention are also applicable to chlorinated materials prepared by other methods. The material prepared by this method not only yields consistent results, regardless of origin, but also possesses a radiation sensitivity several-fold in excess of materials prepared by other methods. This method of preparing a suitable chlorinated hydrocarbon material is exemplified by the following procedure as practiced with chloroform:

A vessel, such as a 5 liter flask is filled about 80% with reagent grade chloroform. Tap water is forced through glass tubing having a constricted orifice to spray jet-like near the bottom of the flask so as to form a fine dispersion of water in the chloroform while the excess water overflows from the flask as it separates from the chloroform. Washing in this fashion is continued for about 40 minutes and the water is decanted. The chloroform is then dried with heated calcium chloride, is transferred into a 5 liter, 45/50 Pyrex glass distillation flask, and the chloroform is distilled through a 1400 mm., ⅜ in. glass helice-filled column at a rate of 500 cc./hr., regulated by an adjustable fraction cutter. The distillation temperature is determined accurately by means of a nitrogen-filled immersion thermometer. Low-boiling impure material is discarded until a constant boiling fraction is obtained. About 8% of the material usually is distilled during this time. The distilled material is collected under alkaline bromcresol purple until about 10% of the original volume remains in the distillation flask. This distillation procedure is repeated until the collected fraction has the desired maximum radiation sensitivity. Since material of the desired quality is generally obtained in the third distillation, the product is collected during this period in a Pyrex flask, protected from light, and containing the indicated amount of the particular stabilizing agent to be employed. Residual material from several distillations may be combined with new material in preparing other satisfactory lots of chloroform.

Materials employed in preparing the aqueous phase of the system should likewise be prepared with considerable care in order to obtain the desired degree of precision and sensitivity. Suitable water can be prepared by distillation through tandem-arranged series of stills and contact with certain reagents. For example, a first glass still is arranged to discharge into a second still likewise arranged to discharge into a third which finally discharges the distilled water into a glass-wool-stoppered Pyrex bottle. Fresh permanganate is maintained to the kettle of the first still, about 5 ml. of 10 N $H_2SO_4$ in the second and no reagent in the third. Preheated water is fed to the first still kettle and distillation is conducted continuously to obtain a suitable product, as indicated, from the third still.

Recrystallized acidimetric dye, i. e., bromcresol purple, yields more sensitive systems and systems in which the color change is more easily detected. Borosilicate glass tubes or vials, subjected to an acid washing treatment and coated with silicone, as described hereinafter, are suitable containers for the system.

Relevant to application in general purpose dosimetry, certain criteria may be noted relevant to the selection of a suitable chlorinated hydrocarbon. An application of this character might include personnel monitoring, medical dosimetry, civil defense dosimetry, area monitoring, and similar operations. For this purpose, chloroform may be employed as exemplifying a suitable material insofar as several requisite properties are concerned. These properties include fluidity at usual ambient temperatures; immiscibility with an aqueous phase; suitable inherent stability as during preparative processing; desirably possess a boiling point above 60° C.; have the requisite inherent sensitivity to irradiation (G value above about 30); suitable characteristics for forming into systems which are thermostable for at least 30 minutes at 85° C., and other properties apparent from context of the present disclosure. Tetrachloroethylene is somewhat superior to chloroform in many of these properties.

Certain materials such as monochlorobenzene which possesses extreme thermostability but are relatively radiation insensitive can be employed in systems designed to measure large amounts of such radiation over long periods of time and under very adverse temperature conditions. Materials such as carbon tetrachloride which are sufficiently sensitive but do not possess high stability can be employed under less rigorous conditions. Some materials such as trichloroethane and trichloroethylene which decompose autocatalytically at room temperature in the absence of stabilizers would usually be unsatisfactory since the behavior thereof would be highly unpredictable. In general, it may be noted, however, that the normalizers of the invention are useful with any chlorinated hydrocarbon as employed in a colorimetric dosimeter of the character described.

It is possible to measure a very wide range of dosages by means of these dosimeters. Values down to or below 1 r. can be measured by employing a high ratio of highly sensitive chlorinated hydrocarbon phase to aqueous dye phase, e. g., 30:1 or 15:1 and increasing the amount of chlorinated hydrocarbon phase employed. With low phase ratios, more alkali and/or dye added to the aqueous phase, and using less sensitive chlorinated hydrocarbons, values above about 5000 r. can be easily determined. Moreover, addition of the normalizers of the invention to such a system generally renders the system less sensitive to irradiation and, therefore, provides another means of adjusting the sensitivity of the system towards the higher ranges. In order to facilitate employment of the high phase ratio systems, the invention provides a specially adapted unit cell described more fully hereinafter.

In assembling a dosimetric system, it is convenient to prepare a concentrated dye solution. Such a solution can be prepared, using bromcresol purple as an illustration, by dissolving a convenient or indicated amount of the purified dye in boiling purified waer, diluting to the required degree, and adjusting the pH to provide the desired sensitivity. For example, 800 mgm. of this dye can be dissolved in 90 ml. of water, the pH adjusted to 5.0 by adding 1 N NaOH thereto and adding sufficient water to increase the total volume to 100 ml. 0.66 ml. of this concentrated stock solution, diluted to 100 ml. with conductivity water may be employed in producing the dosimetric system.

Impurities in different lots of dye also affect the sensitivity of the system. Pure lots of dye gave clear colors at pH values 0.2 to 0.4 unit lower than other lots of dye. Impurities in some lots of dye appear to act as buffers as indicated by dilution experiments. Standard procedure for testing the sensitivity of a dye includes preparation of a concentrated stock solution as above. Buffered standard solutions of the dye are then prepared using stock solution dilutions above and below the generally employed dilution, i. e., 0.66 ml./100 ml. of water. Aliquots of unbuffered solution are taken prior to buffering to test the acid sensitivity. The buffered standards may be prepared, for example, in the pH range of 5.2 to 6.6 in 0.1 pH unit increments. Each of the aliquots is adjusted to the upper pH value with NaOH. Dye sensitivity may be determined by acid titration with $10^{-3}$ N HCl using the amount of acid required to cause a change of 1 pH unit, i. e., 6.4 to 5.4, compared to the colors of standard, as a measure of sensitivity. Comparison of impure (X) and purified lots (Y) of dye, follow:

LOT X (IMPURE)

| Amount of stock dye/100 ml. water | HCl required for 1 pH unit change |
|---|---|
| 0.50 ml | 100 Meq. × $10^{-6}$/ml. |
| 0.66 ml | 120 Meq. × $10^{-6}$/ml. |
| 0.85 ml | 160 Meq. × $10^{-6}$/ml. |
| 1.00 ml | 180 Meq. × $10^{-6}$/ml. |

LOT Y (PURIFIED)

| | |
|---|---|
| 0.50 ml | 90 Meq. × $10^{-6}$/ml. |
| 0.66 ml | 95 Meq. × $10^{-6}$/ml. |
| 0.85 ml | 130 Meq. × $10^{-6}$/ml. |
| 1.00 ml | 160 Meq. × $10^{-6}$/ml. |

The sensitivity of other dyes compared to bromcresol purple is as follows:

| | Amount of acid to produce 1 pH unit change | pH range |
|---|---|---|
| Bromcresol purple | 95 Meq.×$10^{-6}$/ml | 6.4 –5.4 |
| Bromthymol blue | 70–75 Meq.×$10^{-6}$/ml | 7.4 –6.4 |
| Cresol red | 80–85 Meq.×$10^{-6}$/ml | 8.25–7.25 |

Now, it may be noted, that chloroform which has been purified as described above is 25 to 50 or more times as sensitive to radiation as commercially available materials. In other words, a given quantity of X-ray or gamma radiation causes the evolution of 25 to 50 or more times the amount of acid from similar volumes of purified chlorinated hydrocarbons as from commercially available materials. While this effect facilitates preparation of low range instruments, below about 1 r., these purified chlorinated hydrocarbon instruments are subject to the instabilities and inaccuracies noted above; however, as will now be described, the normalizers of the invention easily resolve these difficulties and produce superior systems.

In the beginning it was noted that ethyl alcohol normalizer in amounts of above about 1–2% was effective in eliminating rate dependency effects of the system for irradiation rates up to and somewhat above 600 r. per minute.

Figure 1:
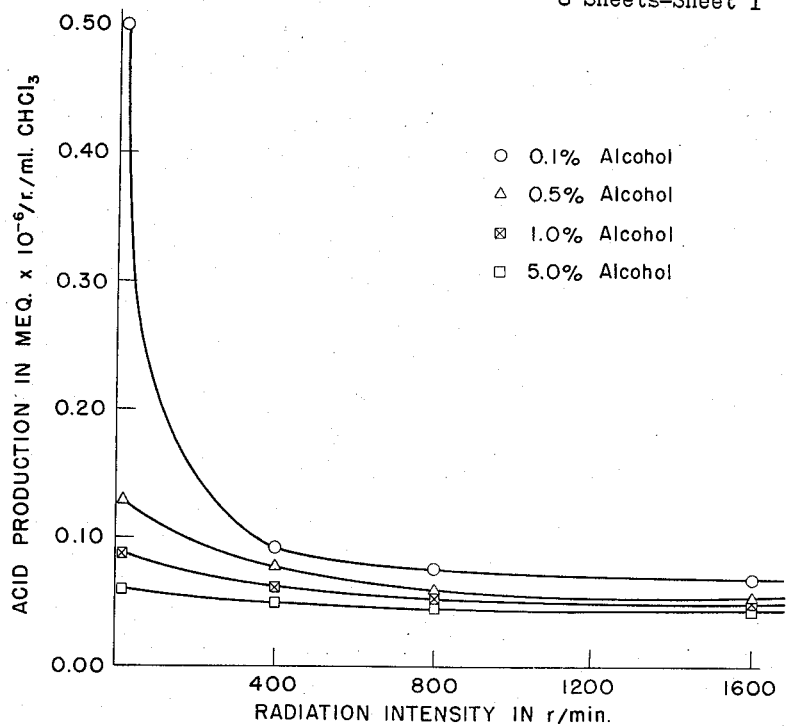
Figure 1 is a graphical illustration of the resolution of rate dependency by alcohol added to the dosimetric system.

The marked effect which alcohol (ethyl) exhibits on the rate dependency is graphically illustrated in Fig. 1 of the drawing. To obtain the results shown therein there was employed a procedure involving the irradiation of 1 cc. of purified chloroform overlayered with 0.5 cc. of diluted stock dye solution, prepared as above and contained in 2 ml. Pyrex glass stoppered flasks. Samples with varying amounts of alcohol were irradiated by exposure to either a 300 mgm. radium source at 5 r./min. or a 96.4 curie $Co^{60}$ source at 400–1600 r./min. Acid produced was determined by titration with standard base and the experimental points illustrated represent the mean value of six separate determinations.

As is apparent from Fig. 1, with irradiation rates below about 600 r./min., a minimum of about 1–2% of alcohol is required to resolve the very serious irradiation rate dependency noted in this range with lesser amounts or no alcohol present. With rates slightly above about 600 r./min., acid liberation appears to approach a constant value irrespective of the amount of alcohol added to the system; however, over a greatly extended range, the deviation may cause an increasing error in indication.

Figure 2:
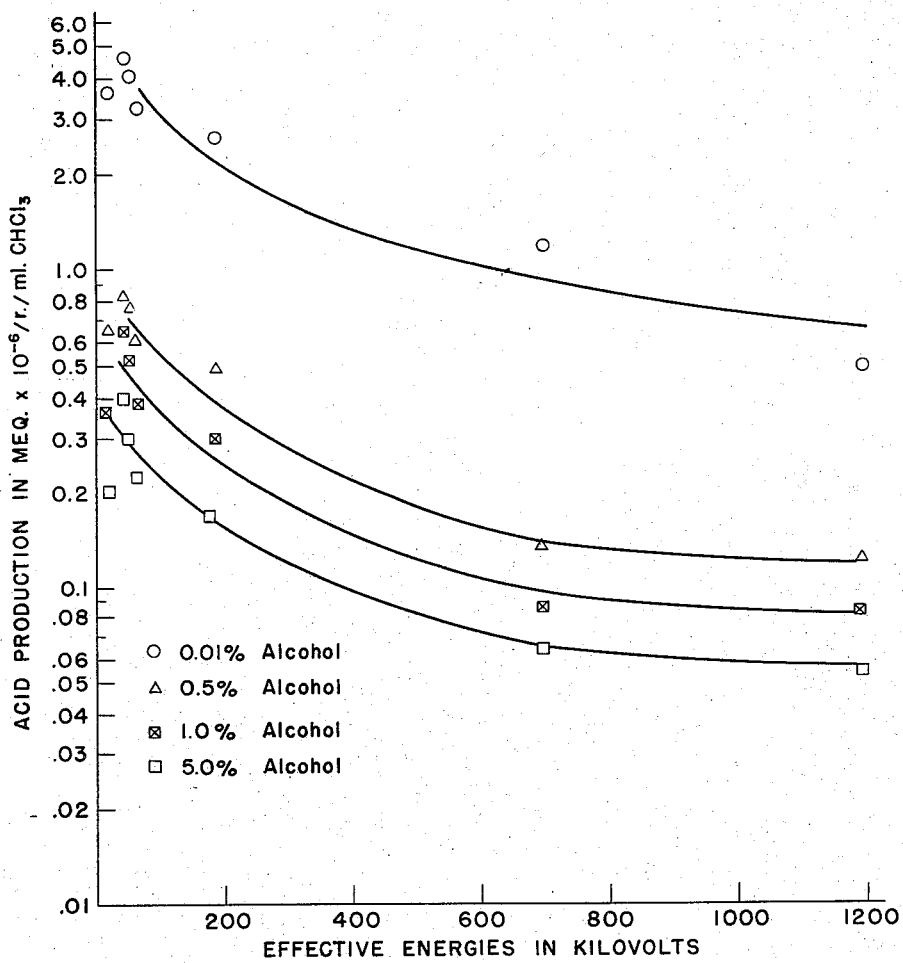
Figure 2 is a graphical illustration of the effect which increasing concentration of ethyl alcohol exerts on acid production by X-ray and gamma radiation of different energies.

Acid production varies for purified chlorinated hydrocarbon systems subjected to irradiation with identical doses of radiation of different energies. Low-molecular alcohols such as ethyl are highly effective, also, for minimizing variations in acid production caused by radiation of different energies by reducing the sensitivity of the system to these various radiations. This is apparent from the results graphically illustrated in Fig. 2, of experiments in which quadruplicate samples, similar to those noted above, were exposed to radiation of 40, 45, 50, 60, 190, 700, and 1200 kilovolts effective energies derived from X-ray, radium, and $Co^{60}$ sources. The amount of acid produced in each case was determined by titration with standard base.

Figure 3:
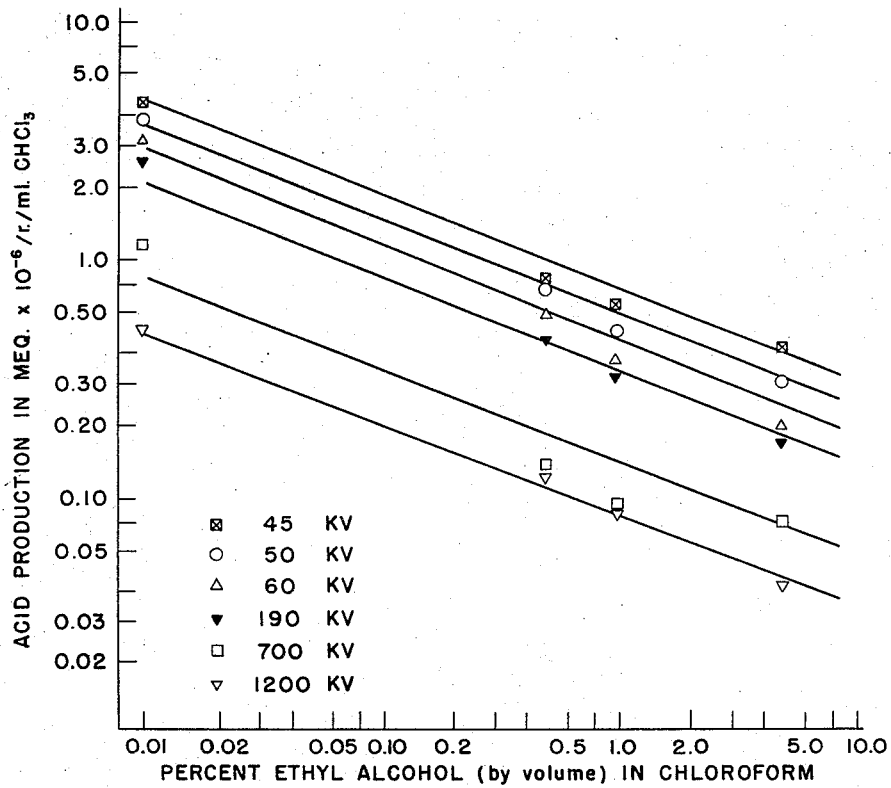
Figure 3 is a graphical illustration of the uniform relation between alcohol content and amounts of acid produced by radiation of different effective energies.

The results of the foregonig experiment may be plotted as amount of acid produced vs. amount of alcohol introduced into the system to yield the graphical illustration of Fig. 3. It may be seen therefrom that there exists a uniform relation between the alcohol content of the irradiated system and the amount of acid produced by irradiation of different effective energies.

The relationships between acid formation, radiation energy, and alcohol content in the reactive system, shown in Fig. 3, indicate that energy dependence factors are not altered by the amount of normalizer in the system. The spectral response of chloroform-dye systems is similar to that of photographic film, and is related primarily to the chlorine content of the system. The relatively greater spectral dependence in film is due to its silver content and its greater atomic number.

Figure 4:
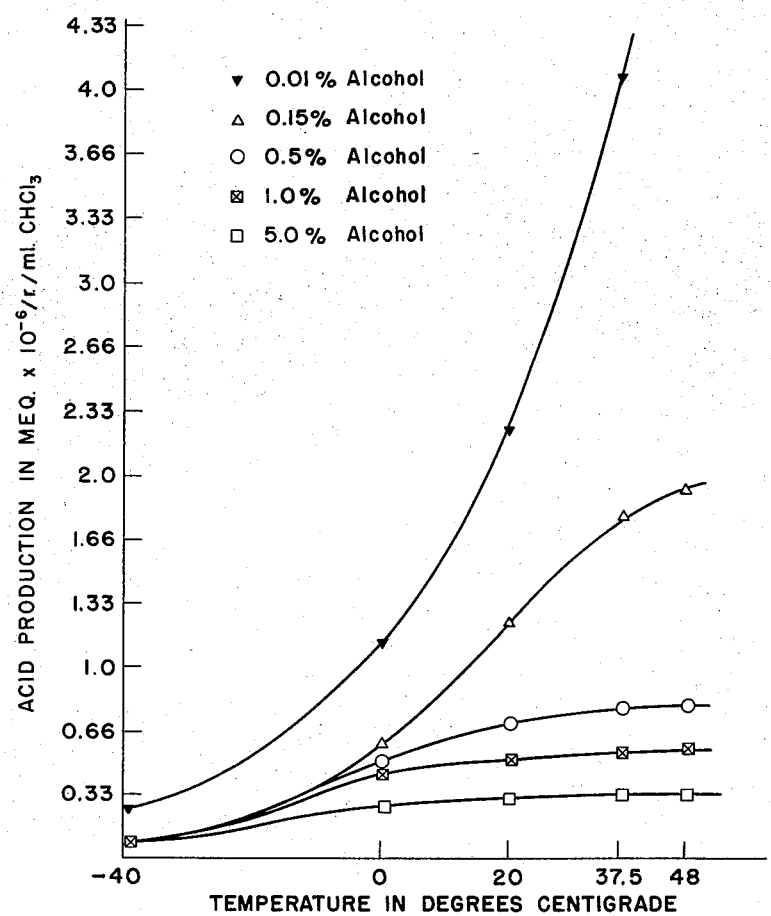
Figure 4 is a graphical illustration of the effect which various amounts of alcohol exert on amounts of acid produced at different irradiation temperatures.

In addition to the foregoing effects, alcohol is very effective in reducting the variations caused by irradiation temperature change as illustrated in Fig. 4. The results illustrated therein were obtained by irradiating quadruplicate samples, as above, at different temperatures in a temperature controlled water bath, with 76 r./min. of X-rays from a 250 kvp. X-ray unit, filtered with 0.25 mm. Cu and 1.0 mm. Al. As may be noted therefrom, alcohol in amounts exceeding about 0.5%, substantially eliminates variations in amounts of acid produced at different temperatures.

Alcohols are also very effective in preventing evolution of acid in the system subsequent to termination of the radiation exposure. This effect may be seen from Fig. 5 of the drawing, wherein are illustrated the results of experiments in which systems, similar to those noted above, and containing various amounts of alcohol were titrated at different elapsed times after exposure to 300 r. of radiation from a radium source. Alcohol in concentrations above about 0.1% effectively eliminates after reaction evolution of acid.

Hydroquinone and α-tocopherol behave in a manner similar to that of the low-molecular weight alcohols. Resolution of rate dependency is a convenient criterion for determining the effectiveness of various agents. To compare hydroquinone with alcohol, quadruplicate sample systems comprising 1.0 ml. of chloroform overlayered with 0.5 ml. of aqueous dye (pH 6.0) were irradiated with 250 kv. X-rays, filtered with 0.25 mm. Cu and 1.0 Al, at the rates of 289 r./min. and 2.5 r./min. Such systems included alcohol-free, 0.1% added alcohol, 40, 100, and 300 parts per million of added hydroquinone, and 0.1% added alcohol plus 40, 100, and 300 p. p. m. of hydroquinone with the acidic titration results illustrated in portions A, B, and C of Fig. 6.

However, these particular normalizer agents are thermolabile and are, therefore, useful only under mild conditions.

Certain other normalizers have been found which, when present in sufficient amounts to reduce the sensitivity of a 4:1 ratio chloroform-aqueous dye system to a value in the range of about 0.02 to 0.08 m. eq. of acid/ml. $CHCl_3$/roentgen, are capable of reducing dependency on irradiation rate to the vanishing point. Such sensitivity being measured at high rates, for example, 150 r./min. of $Co^{60}$ gamma radiation. These normalizers also yield better heat stabilities than alcohol. Times for pH to change ½ a unit for cells immersed in a water bath at 85° C. (other arbitrary temperatures may also be employed) may be used as a measure of thermostability.

These superior normalizers include amyl, hexyl, nonyl, and decyl alcohols, resorcinol, garaniol, metacresol, α-naphthol, methyl-n-hexanol, benzyl alcohol, tetrahydrofurfural alcohol, tetrahydrofurfuran and methyl-n-cyclohexanol. Indicative of the superior results obtained with these normalizers are those obtained in the normalization of acid production by various concentrations of resorcinol. Results of experiments conducted in a fashion similar to those above, are illustrated in Fig. 7 of the drawing. Fig. 8 of the drawing illustrates the normalization of acid production at different irradiation temperatures by resorcinol in chloroform dosimetric systems.

Dosimetric systems normalized with 2.0% alcohol or 0.2% resorcinol overlayered with dye phase containing similar amounts of normalizer liberates sufficient acid to cause a pH change from 6.2 to 5.4 with a dosage of 350 to 400 roentgens when a $CHCl_3$ to dye phase ratio of 4:1 is employed. However, where the irradiation rate of the radiation to be measured is increased above about 600 r./min. the resorcinol is a much more effective normalizer. For example, at about $10^5$ r./min., a corrective factor of about 200% is required for alcohol. For the resorcinol system, correction of less than 10-20% is required and, usually, such a small correction can be ignored under such conditions. Better heat and aging stability as well as other benefits are also conferred by these more effective normalizers. Various concentrations of the normalizers are required to provide optimum results; however, these concentrations will usually be in the range of about 0.01 to 5%.

It will be found that the results cannot always be predicted as to which normalizer will be the most effective in any given system. In a system employing tetrachloroethylene, metacresol normalizer appears to give best results. Such a system is ruggedly heat stable, has adequate sensitivity and is rate independent. Also, contact between the phases on shaking is improved permitting accurate determinations under adverse conditions. Geraniol is also very effective in this particular system.

In practice it has been found that very accurate spectrophotometric determinations may be made of the pH of systems employing bromcresol purple indicator thereby permitting selection of dosimeters of predictable sensitivity and very accurate determination of dosages. Bromcresol purple as employed in a chloroform-aqueous dye system has two peak adsorptions bands, viz., 590 mu and 430 mu. As the pH of the dye phase is reduced from 7.4 to 5.0 (purple to yellow color change) the percentage transmission of each band changes in inverse relation; moreover, the ratio of the spectrophotometric readings is related to pH provided conditions such as dye concentration, tube size, light source, and glass thickness are maintained constant.

To relate pH to the aforesaid ratio, it is convenient to construct a standard curve. Using, for example, a Beckman Spectrophotometer model DU, standardization is accomplished at 100% transmission by using a blank tube of distilled water, a split width of 0.068 mm. and a wavelength of 430 mu. This operation is repeated with a wavelength of 590 mu., a split width of 0.30 mm. and a neutral filter. Now the foregoing procedure is repeated using similar tubes of bromcresol purple solutions buffered at pH values ranging from 5.0 to 7.4. Then $$\frac{\text{percent T at 590 mu}}{\text{percent T at 430 mu}}$$

vs. pH is plotted. A typical plot of this relation is shown in Fig. 9 of the drawing. The pH of an unknown system can then be found by determining the said ratio and using the standard curve.

Gamma or X-ray radiation dosage may be determined accurately (within ± 1 to 2%) by use of this spectrophotometric technique. For example, dosimeters prepared of purified chloroform and aqueous dye (0.66 ml. concentrated stock solution/100 ml. water) in the ratio of 4:1, and having identical pH as graded by means of the spectrophotometer, were exposed to known amounts of $Co^{60}$ gamma radiation. The pH of the exposed samples was plotted against dosage as shown in Fig. 10 of the drawing. Exposure of similar dosimeters to unknown amounts of similar radiation followed by pH determination as above and reference to the curve of Fig. 10 yielded an accurate indication of the unknown amount of radiation. This method is considerably more accurate than titration methods which are also applicable.

As may be noted, the dosimetric system of the invention comprises a chlorinated hydrocarbon phase overlayered with an aqueous dye phase and containing a normalizer as well as other materials. It is difficult to "read" the dosimetric system when high ratios of hydrocarbon to dye are used in preparing the more sensitive devices. To overcome this difficulty and provide more standard conditions with colorimetric dosimetric systems in general, there is provided a unit cell as illustrated in Fig. 11 of the drawing.

Such a unit cell 21 may be constructed of a length of cylindrical glass tubing closed to provide a lower flattened end 22. The tube is constricted at a location 23 providing a tubing section 24 having an internal volume, $Vt$, equal to slightly more than that of the volume, VCCl, of chlorinated hydrocarbon 25 employed therein. Accordingly, the volume, $Vaq$, of aqueous dye phase 26 disposed therein will occupy the constricted portion 23 of the cell when the latter is in an upright position. Above the constricted portion 23 of the tube sufficient tubing length 27 is provided to form an airspace 28 and finally the upper end of the tubing is sealed to form the tip 29 as described hereinafter.

It is necessary to construct the tubing of an inert transparent material. For this purpose, borosilicate glass, such as Neutraglas, produced by the Kimble Glass Co., is suitable when properly treated.

Such treated cells may be prepared by immersion overnight in a 1% solution of nitric acid in concentrated sulfuric acid (ca 18 hrs.) as in a vacuum desiccator, using vacuum to introduce the acid into the tubes. The acid may then be removed by means of vacuum and tap water sprayed into the tubes for about 4 minutes. A six-fold washing (or until pH remains constant) with distilled water is then employed as by inverting the cells in a beaker of distilled water and boiling for 10 minutes then cooling the bases of the tubes with distilled water and finally shaking the water from the cells. Such washed cells are then dried as in a hot air oven.

The foregoing treatment is quite beneficial in minimizing leaching of alkali from the cell walls; however, it is preferred that the cells are provided with an interior silicone coating as described hereinafter.

Such a silicone coating treatment may be accomplished by injecting about 0.5 ml. of a 3 ml. of silicone, e. g., Dow Corning No. 200, 200 cstks. solution, in 100 ml. of ether, into each cell as by means of a hypodermic needle and syringe. Excess solution is then drained from the tubes, ether evaporated by heating for a short time at 60° C. and finally baking at about 158° C. for about 3 to 3½ hours. By means of this siliconing treatment, leaching of alkali from the cell walls is virtually eliminated.

Filling of the tubes with the chlorinated hydrocarbon and aqueous dye solutions can be by manual pipetting or by machine methods. For preparation of a few cells the filled cells can be frozen as in an acetone Dry Ice bath and then sealed by application of a flame. Attempts to seal the tubes without freezing, as in automatic vial sealing machines, were unsuccessful. However, it was discovered that the difficulty could be remedied by flushing the upper neck portion of the filled tubes with heated nitrogen for 2 to 3 minutes immediately prior to flame sealing. The source of the difficulty appears to be in chlorinated hydrocarbon adhering to the glass walls above the aqueous phase, such material being removed by the heated nitrogen flush procedure. As a result of this discovery, such cells can now be filled and sealed on automatic equipment of the conventional type.

In preparing dosimetric cells of this character, it will usually be convenient to employ a fixed quantity, VCCl, of the chlorinated hydrocarbon phase and then to regulate the sensitivity by varying phase ratios, i. e., by employing more or less aqueous phase, by regulating the pH of the aqueous phase, by varying the amount of normalizer, or by other methods noted in the foregoing. Such cells are preferably graded by the spectrophotometric method noted, supra, while determination of the dosage may be made by visually noting color changes in a graded series of cells of varying sensitivity or by the spectrophotometric method discussed above. Acidimetric titration may also be employed to determine acid production. Also, exposure of underexposed tubes of known characteristics to additional known amounts of radiation to cause a color change and calculation by difference of the unknown original amount of radiation can be employed to determine X-ray or gamma radiation dosages by means of these cells.

In accordance with the invention a dosimeter capable of indicating dosages over selected ranges may be provided as shown in Figs. 12, 13, and 14 of the drawing. As illustrated therein, four dosimetric cells 31, 32, 33, and 34, of different predetermined sensitivities, for example, 50, 200, 400, and 600 r., respectively, are arranged in a case 35. Such case 35 is formed generally as a flattened rectangular cube with a receptacle portion 36 and hinged cover 37 both of pressed thin gauge metal. The hinged cover is adapted to telescope over rim portions of receptacle 36 and be retained by a detent 38. A face plate 39 having a transverse slot 40 formed therein is disposed to cover the receptacle portion 36 and is retained in such position by a skirt 41 depending therefrom to fit in telescoping relation with interior wall portions of said receptacle. Detents 42 in said skirt 41 and receptacle walls may be provided to lock the face plate 39 in place.

As it is often desirable to shield the sensitive elements from low energy secondary radiation a liner 43 of sheet lead 0.5 mm. thick and having a slot 44 corresponding to the slot 40 in face plate 39 is provided in the cavity 45 defined by the face plate 39 and receptacle 36.

To provide a shock-resistant mounting for the dosimetric cells 31—34, a rubber mounting element 46 formed, as by extrusion, with parallel longitudinal channels 47 adapted to receive and substantially encircle a cell (31—34) is disposed within said cavity 45 with the channels 47 perpendicularly oriented with respect to and visible through slots 41 and 44 of the face plate 39 and liner 43, respectively. Accordingly, when the cells 31—34 are disposed in the channels 47, the constricted portions 23 (Fig. 11) thereof are visible through said slots 41 and 44. Protection of the cells from longitudinal shocks is afforded by providing resilient members 48 such as rubber between the cell ends and the lead liner 43.

It will be apparent that such a dosimeter can be employed under rigorous conditions and in many varied circumstances to determine X-ray and gamma radiation exposures. When prepared in accordance with the teachings of the invention, all that is required to measure such exposure is a brief shaking of the dosimeter and visual observation while in an upright position. It will, of course, be apparent that any number of cells may be provided to allow determination of dosages over very wide ranges. Results obtained by means of these devices are closely correlated to those obtained by standard methods such as N. B. S. photographic film packs.

While in the foregoing there have been described what may be considered to be preferred embodiments of the invention, modifications may be made therein without departing from the teachings of the invention and it is intended to cover all such as fall within the scope of the appended claims.

What is claimed is:

1. A colorimetric gamma and X-ray dosimetric system sealed in an inert transparent container and comprising a chloriated hydrocarbon phase selected from the group consisting of chloroform, carbon tetrachloride, tetrachloroethylene, and monochlorobenzene, and an aqueous acidimetric dye phase in contact with said chlorinated hydrocarbon phase, said phases having dissolved therein an effective amount of a normalizer selected from the group consisting of aliphatic alcohols, resorcinol, geraniol, metacresol, α-naphthol, benzyl alcohol, tetrahydrofurfural alcohol, tetrahydrofurfuran, hydoquinone, α-tocopherol, and methyl-n-cyclohexanol.

2. A single cell two phase coloimetric gamma and X-ray dosimeter comprising a sealed borosilicate glass container, a silicone coating on the interior of said container, a chlorinated hydrocarbon phase selected from the group consisting of chloroform, carbon tetrachloride, tetrachloroethylene, and monochlorobenzene, and an aqueous acidimetric dye phase in contact with said chlorinated hydrocarbon phase, said phases having dissolved therein an effective amount of a normalizer selected from the group consisting of aliphatic alcohols, resorcinol, geraniol, metacresol, α-naphthol, benzyl alcohol, tetrahydrofurfural alcohol, tetrahydrofurfuran, hydroquinone, α-tocopherol, and methyl-n-cyclohexanol.

3. A colorimetric gamma and X-ray dosimetric system sealed in an inert transparent container and comprising a chlorinated hydrocarbon phase selected from the group consisting of chloroform, carbon tetrachloride, tetrachloroethylene, and monochlorobenzene, and an aqueous acidimetric dye phase in contact with said chlorinated hydrocarbon phase, said phases having dissolved therein an effective amount of a normalizer selected from the group consisting of aliphatic alcohols, resorcinol, geraniol, metacresol, α-naphthol, benzyl alcohol, tetrahydrofurfural alcohol, tetrahydrofurfuran, hydroquinone, α-tocopherol, and methyl-n-cyclohexanol, and wherein the volume of the chlorinated hydrocarbon phase is made larger than that of the aqueous phase thereby increasing the sensitivity of the system.

4. The system as otherwise defined in claim 1 wherein said normalizer comprises ethyl alcohol in amounts above about 1–2% of the said phases.

5. The system as otherwise defined in claim 1 wherein said normalizer comprises resorcinol in amounts above about 0.2% of said phases.

6. The system as otherwise defined in claim 1 wherein said normalizer comprises metacresol.

7. A colorimetric gamma and X-ray dosimetric system sealed in an inert transparent container and comprising a chlorinated hydrocarbon phase selected from the group consisting of chloroform, carbon tetrachloride tetrachloroethylene, and monochlorobenzene, and an aqueous acidimetric dye phase containing an acidimetric dye selected from the group consisting of bromcresol purple, bromthymol blue, and cresol red, said phases having dissolved therein an effective amount of a normalizer selected from the group consisting of aliphatic alcohols, resorcinol, geraniol, metacresol, α-naphthol, benzyl alcohol, tetrahydrofurfural alcohol, tetrahydrofurfuran, hydroquinone, α-tocopherol, and methyl-n-cyclohexanol.

8. As a container for a two phase colorimetric dosimetric system, a cell formed of borosilicate glass provided with an internal coating of silicone material to eliminate leaching of alkaline materials therefrom.

9. As a container for a two phase colorimetric dosimetric system, a cell formed of borosilicate glass provided with an internal coating of silicone material, said cell being in the form of an elongated tube sealed at the upper and lower ends and constricted at a location whereby the chlorinated hydrocarbon phase of said dosimeter occupies the space beneath said constriction and the aqueous phase of said dosimeter occupies the space within said constriction with an airspace thereover.

10. A method for determining X-ray and gamma irradiation dosages comprising irradiating a series of two phase colorimetric dosimeters in which the acidimetric indicator dye is bromcresol purple and the dosimetric systems respond with similar characteristics to various known amounts of such radiation as selected by spectrophotometric means, determining the pH of the aqueous phase of said dosimeters by spectrophotometric determination of the ratio $$\frac{\text{Percent T at 590 mu}}{\text{Percent T at 430 mu}}$$

constructing a plot of said pH as related to the amount of irradiation to which such dosimeters were exposed, irradiating dosimeters similar to said dosimeters with unknown amounts of like radiation, determining the pH of the aqueous phase of said dosimeters by spectrophotometric determination of the ratio $$\frac{\text{Percent T at 590 mu}}{\text{Percent T at 430 mu}}$$

and comparing said pH with said plot of pH and known radiation values, whereby the unknown amount of radiation may be determined.

11. A dosimeter for colorimetrically indicating exposure to gamma and X-ray radiation comprising a metal case formed as a flattened generally rectangular cube with a receptacle portion and a cover portion, a face plate disposed over the said receptacle portion of the case having a slot formed therein and defining a cavity with said receptacle portion, a channeled resilient member disposed within said receptacle portion whereby the channels thereof may be viewed through the slot in said face plate, and two phase colorimetric dosimetric cell systems of the character described disposed within said channels with the aqueous phase thereof visible through said slot.

12. A dosimeter for colorimetrically indicating exposure to gamma and X-ray radiation comprising a metal case formed as a flattened generally rectangular cube with a receptacle portion and a cover portion, a face plate disposed over the said receptacle portion of the case having a slot formed therein and defining a cavity with said receptacle portion, a lead liner of sufficient thickness to exclude only low energy radiation fitting closely within the walls of said cavity in the receptacle portion and having a slot corresponding with that in said face plate, a channeled resilient member disposed within said receptacle portion whereby the channels thereof may be viewed through the slot in said face plate, and two phase colorimetric dosimetric cell systems of the character described disposed within said channels with the aqueous phase thereof visible through said slot.

13. A dosimeter for colorimetrically indicating exposure to gamma and X-ray radiation comprising a metal case formed as a flattened generally rectangular cube with a receptacle portion and a cover portion, a face plate disposed to cover said receptacle portion and defining therewith a cavity, said plate being provided with a slot whereby the interior of said cavity may be viewed, a lead liner of about 0.5 mm. thickness fitting closely within the walls of said cavity and having a slot formed therein corresponding to the slot in said face plate, a channeled resilient member disposed within said cavity, and two phase colorimetric dosimetric cell systems of the character described disposed within the channels of said resilient member with the exposure indicating aqueous phase thereof visible through the slot in said face plate.

14. A dosimeter for colorimetrically indicating exposure to gamma and X-ray radiation comprising a metal case formed as a flattened generally rectangular cube with a receptacle portion and a cover portion, a face plate disposed to cover said receptacle portion and defining therewith a cavity, said plate being provided with a slot whereby the interior of said cavity may be viewed, a lead liner of about 0.5 mm. thickness fitting closely within the walls of said cavity and having a slot formed therein corresponding to the slot in said face plate, a channeled resilient member disposed within said cavity, two phase colorimetric dosimetric cell systems of the character described disposed within the channels of said resilient member with the exposure indicating aqueous phase thereof visible through the slot in said face plate, and resilient members disposed between the ends of said cells and adjacent portions of said liner.

15. A dosimeter for colorimetrically indicating exposure to gamma and X-ray radiation comprising a metal case formed as a flattened generally rectangular cube with a receptacle portion and a cover portion, a face plate disposed to cover said receptacle portion and defining therewith a cavity, said plate being provided with a slot whereby the interior of said cavity may be viewed, a channeled resilient member disposed within said cavity, and a series of two phase colorimetric dosimetric cells disposed in the channels of said resilient member said cells comprising a sealed elongated borosilicate glass tube internally coated with silicone and constricted to provide upper and lower communicating chambers, a chlorinated hydrocarbon phase disposed in the lower of said chambers, and an aqueous acidimetric indicator dye phase overlayering said organic phase with at least a portion thereof being disposed in the constricted portion of said tube such constricted portion of said tube being visible through the slot in said face plate.

16. A dosimeter for colorimetrically indicating exposure to gamma and X-ray radiation comprising a metal case formed as a flattened generally rectangular cube with a receptacle portion and a cover portion, a face plate disposed to cover said receptacle portion and defining therewith a cavity, said plate being provided with a slot whereby the interior of said cavity may be viewed, a channeled resilient member disposed within said cavity, and a series of two phase colorimetric dosimetric cells disposed in the channels of said resilient member said cells comprising a sealed elongated borosilicate glass tube internally coated with silicone and constricted to provide upper and lower communicating chambers, a chlorinated hydrocarbon phase disposed in the lower of said chambers, and an aqueous acidimetric indicator dye phase overlayering said organic phase with at least a portion thereof being disposed in the constricted portion of said tube and a normalizer agent dissolved in said phases such constricted portion of said tube being visible through the slot in said face plate.

17. A dosimeter for colorimetrically indicating exposure to gamma and X-ray radiation comprising a metal case formed as a flattened generally rectangular cube with a receptacle portion and a cover portion, a face plate disposed to cover said receptacle portion and defining therewith a cavity, said plate being provided with a slot whereby the interior of said cavity may be viewed, a lead liner of about 0.5 mm. thickness fitting closely within the walls of said cavity and having a slot formed therein corresponding to the slot in said face plate, a channeled resilient member disposed within said cavity, colorimetric dosimeter cells disposed within the channels of said resilient member which cells include an enlarged lower portion having disposed therein a liquid chlorinated hydrocarbon phase having a normalizing agent dissolved therein and a constricted portion enclosing an aqueous acidimetric indicator dye phase which overlayers said hydrocarbon phase, said constricted portion of the cells being visible through said slot in the face plate, and resilient members disposed between the ends of said cells and adjacent portions of the liner.

18. A single cell gamma and X-ray dosimeter comprising a sealed borosilicate glass tubular container constricted to provide upper and lower communicating portions, an internal silicone coating in said container, a chlorinated hydrocarbon phase disposed in the lower portion of said container, a smaller volume of aqueous acidimetric indicator dye phase overlayering said hydrocarbon phase and enclosed in said constricted container portion, and a normalizer agent of the character defined dissolved in said phases.

19. The method of determining X-ray and gamma irradiation dosages as defined in claim 10 but wherein said dosimeters include a normalizer agent of the specified character dissolved in said phases.

References Cited in the file of this patent

UNITED STATES PATENTS

| | | |
|---|---|---|
| 1,594,470 | Kubots | Aug. 3, 1926 |
| 1,922,458 | Schaeffer | Aug. 15, 1933 |
| 2,095,056 | Clough | Oct. 5, 1937 |
| 2,265,762 | McKittrick et al. | Dec. 9, 1941 |
| 2,361,640 | McKinnis | Oct. 31, 1944 |
| 2,501,537 | Adams | June 4, 1946 |
| 2,440,315 | Tuve | Apr. 27, 1948 |
| 2,452,385 | Merckel | Oct. 26, 1948 |
| 2,568,029 | Seemar | Sept. 18, 1951 |
| 2,578,703 | Hopkins et al. | Dec. 18, 1951 |
| 2,616,051 | Daniels | Oct. 28, 1952 |
| 2,633,428 | Klug | Mar. 31, 1953 |
| 2,643,230 | Mooradian et al. | June 23, 1953 |
| 2,695,614 | Lockhart | Nov. 30, 1954 |
| 2,700,736 | Roberts | Jan. 25, 1955 |
| 2,712,519 | Hoppe | July 5, 1955 |
| 2,736,815 | Marshall | Feb. 28, 1956 |

OTHER REFERENCES

Bennetts Chemical Dictionary, Chemical Publishing Co., New York, N. Y., 1947.

A Colorimetric Dosimeter for Qualitative Measurement of Penetrating Radiations, by G. V. Taplin and C. H. Douglas, from Radiology, vol. 56, April 1951, pp. 577–591.